June 30, 1970 — J. L. CHAZEN — 3,518,078
PORTABLE AUTO PREPARATOR
Filed Nov. 14, 1966
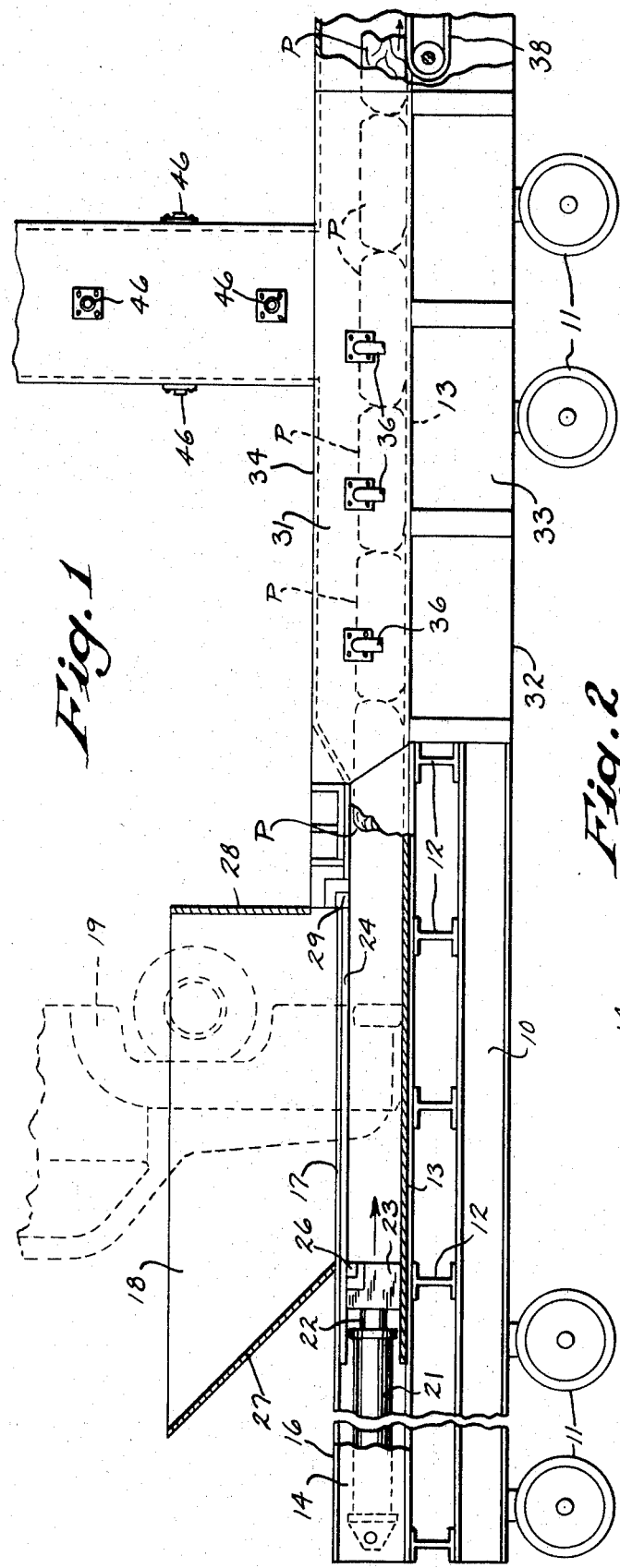
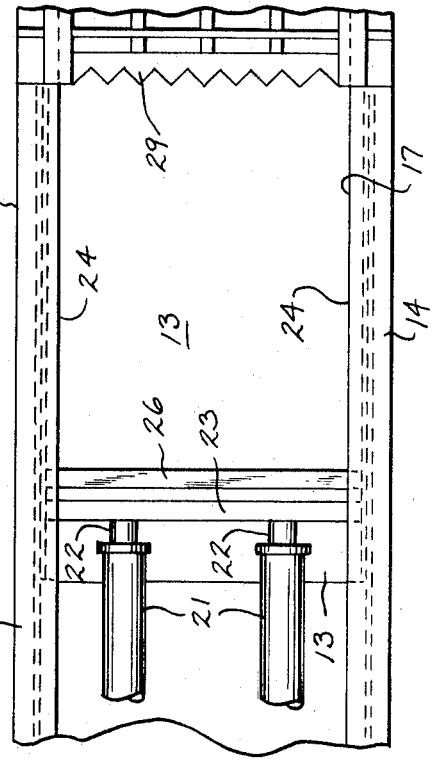
INVENTOR
JULIUS L. CHAZEN
BY
ATTORNEYS

United States Patent Office 3,518,078
Patented June 30, 1970

3,518,078
PORTABLE AUTO PREPARATOR
Julius L. Chazen, c/o SMC Industries,
Chattanooga, Tenn. 37401
Filed Nov. 14, 1966, Ser. No. 594,203
Int. Cl. C21b 1/30; F23g 5/02; B26d 7/06
U.S. Cl. 75—44                    5 Claims

ABSTRACT OF THE DISCLOSURE

A method in which junked vehicles have portions sheared off, one after another, by a shearing plunger which also causes intermittent advance of the sheared portions into and through an incinerator where the combustible contaminants are burned off.

---

This invention relates to an improved method and apparatus for converting junked vehicles to re-usable scrap metal.

Heretofore the largest source of scrap metal has been baled automobile bodies, in which there is necessarily a large amount of contaminants such as wood, rubber, aluminum, plastic, fabrics, and other materials besides steel. Attempts to burn automobile bodies prior to baling has only partially reduced the percentage of contaminants. As a result, scrap metal from automobile bodies is presently rated only as No. 2 scrap material, and is in increasingly less favor with the steel mills because of certain conditions which make it highly desirable to use higher grade scrap.

Heretofore various other methods have been proposed for preparing scrap metal from automobile bodies, such as the use of a hammermill. However, a hammermill of sufficient size is extremely expensive so that wide usage of this method has not resulted. Furthermore, there is still the problem of separating the contaminants. In accordance with the present invention it is proposed to provide means for shearing the automobile into smaller portions of a size where the contaminants are more thoroughly exposed, and to then provide for incineration of these portions before further processing of the sheared portions.

With the above considerations in mind, the principal object of the invention is to provide an improved method which includes the steps of progressively shearing a vehicle into smaller portions, and continuously advancing said sheared portions, one after another, into and through an incinerator with the latter positioned adjacent the shearing unit; and which includes the step of continuously, automatically discharging the sheared and incinerated portions from the incinerator for further processing, which processing may be carried out in a baler, shredder, or other piece of equipment, depending upon requirements.

A further object of the invention is to provide improved apparatus for effecting commercial exploitation of the improved method.

A further object of the invention is to provide improved apparatus wherein the shearing ram performs the dual function of shearing off the vehicle portion and of causing advance of sheared portions through the incinerating zone to a place of discharge.

A further object of the invention is to provide an improved apparatus for reducing junked automobiles or other vehicles to scrap metal, as described, which novel apparatus is mobile to permit a scrap car dealer to utilize the same on his lot without necessitating the transporting of said junked vehicles, and which mobility facilities the use of said apparatus with balers and other stationary processing equipment.

Still further objects of the present invention are to provide a novel method and apparatus for the purpose described which is relatively simple and inexpensive in design, which is reliable in operation, and which is otherwise particularly well suited for its intended purposes.

With the above and other objects in view, which other objects and advantages will become apparent hereinafter, the invention comprises the novel and improved method and apparatus described in the following specification and also any and all modifications or variations thereof as may come within the spirit of said invention, and within the scope of the appended claims.

In the accompanying drawing wherein there is shown one preferred embodiment of the apparatus featured in the present invention, and wherein the same reference numerals designate the same parts in both of the views:

FIG. 1 is a side elevational view of the apparatus with parts thereof broken away and shown in section; and FIG. 2 is a fragmentary top plan view showing the coacting shear elements employed in said apparatus.

Referring now more particularly to FIG. 1 of the drawing, the numeral 10 designates an elongated horizontal subframe, and the numeral 11 indicates a plurality of supporting wheels spaced along the length of said frame, said wheels permitting the structure to be moved about as desired. As hereinabove mentioned, mobility of the apparatus utilized in the present invention is one of the important advantages inasmuch as it permits a scrap car dealer to conveniently utilize the same on his lot without requiring the prior transporting of the junked vehicles, the latter being difficult and time-consuming. In addition, and as will be hereinafter described in greater detail, the maneuverability and mobility of said device facilitates its use in conjunction with balers and other conventional scrap metal processing equipment.

Supported on and above said lower framework 10 by means of transverse I-beams 12 or other suitable supports is a floor element or bed 13, and extending upwardly on the opposite sides thereof are vertical side walls 14, there being a top or cover member 16 extending between said side walls to form an enclosed chamber. An opening 17 is provided in the top 16, and connected therewith is a loading hopper 18 communicating with the interior of said chamber. Said hopper has an inclined rearward wall 27 and a forward wall 28, and is of a size to receive an automobile 19 or other vehicle when the latter is lowered endwise therein by means of a crane or the like, as shown in broken lines in FIG. 1.

Suitably supported in a location between the side walls 14, rearwardly of the hopper 18, is a pair of parallel hydraulic cylinders 21 having extensible rams 22 (FIG. 2), there being suitable fluid lines and controls (not shown) therefor, and carried on the outer ends of said rams is a ram head 23 which is movable longitudinally of said walls 14 and is designed to ride in guideways 24 supported on the bed floor 13. Mounted within and along the upper forward portion of said ram head 23, and forming the leading upper edge thereof, is a straight, horizontal shear blade 26. Said blade 26 is positioned behind the hopper opening 17 when the hydraulic rams 22 are in their retracted position, as shown in FIG. 1, and said rams and blade have a travel distance greater than the length of said hopper opening when said rams are fully extended, as will be described. While it is preferred to use a pair of said extensible hydraulic cylinder and ram units 21, 22, it is to be understood that any desired number of said units could be employed.

Mounted adjacent and forming the forward margin of the hopper opening 17 is a serrated, fixed, horizontal shear blade 29 which spans the side walls 14, and which serrated blade is designed to coact with the blade 26 carried by the movable ram head 23 to shear off a portion of a vehicle inserted into the loading hopper 18, as will be more fully described hereinafter.

Forwardly of the hopper wall 28 the novel apparatus comprising the present invention includes an incinerator 31 which is formed as a continuation of the hopper and shear unit, and which incinerator is designed to receive sheared portions of a vehicle from said hopper. Said incinerator includes a bottom 32, side walls 33, and top 34, and the aforementioned bed floor 13 underlying the hopper also extends the length of said incinerator. Mounted in the incinerator side walls 33 are a plurality of burners 36 connected to a suitable source of gas or other fuel, and projecting from the top of said incinerator is an exhaust stack which is provided with air openings 46. Suitable burner and temperature controls may be conveniently located on said incinerator. As will be seen in FIG. 1, an endless conveyor 38 is mounted immediately adjacent the discharge end of said incinerator in alignment with the bed 13, and suitable power means (not shown) are provided for driving said conveyor.

In the operation of the illustrated apparatus, a junked automobile 19 or other vehicle is suspended endwise over the loading hopper 18 by means of a crane or the like and is lowered into said hopper until the lower end of said vehicle rests upon the bed 13. The hydraulic cylinders 21 are then actuated to extend the rams 22 and as said rams move forwardly to an extended position the shear blade 26 carried by the ram head 23 engages against said vehicle 19. When said blade 26 approaches the forward or discharge end of the hopper it coacts with the serrated blade 29 to shear off that portion of the vehicle which is therebelow.

In accordance with the present invention, and as hereinabove described, the hydraulic rams 22 have a travel length greater than the length of the hopper opening 17, and as the ram head 23 passes beneath the shearing edge of said hopper it functions to push the sheared vehicle portion P and cause it to progress toward the incinerator 31, where the burners 36 begin consuming any non-metallic combustibles in said vehicle portion.

The hydraulic rams 22 are then retracted to the position shown in FIGS. 1 and 2 to allow the vehicle 19 to again descend to a position wherein its lower end rests on the bed 13, and said rams are then extended again to shear off another portion P of said vehicle. As said vehicle portion P is pushed toward the incinerator 31 by the ram head 23 it engages the previously-sheared portion P and pushes the latter further into said incinerator. Said operation is repeated as the vehicle is progressively lowered into the hopper 18, and as each succeeding sheared portion P is introduced into the incinerator it functions to advance the previously-sheared portions to provide a continuous progression of said vehicle portions through said incinerator. Thus it will be seen that in the apparatus employed in the present invention the hydraulically-actuated ram head and blade unit 23, 26 performs the dual function of shearing off portions of a vehicle and simultaneously continuously urging said sheared vehicle portions through the adjacent incinerator toward its discharge end. The repeated intermittent operation of the hydraulic rams 22 can be automatically timed and controlled.

The incinerator 31 is of such length as the ensure that all of the upholstery, rubber, and other combustibles in the vehicle portion will be effectively incinerated by the time the sheared portion reaches the discharge end of said incinerator, and the B.t.u. output of the burners 36 and timing of the action of the rams 22 can be easily adjusted and set to promote a sufficiently effective removal of said non-metallic materials so that the quality of the scrap is substantially upgraded.

As each succeeding sheared metal portion P completes its travel through the incinerator 31 and reaches the discharge end it is pushed by the following sheared portion P onto the endless conveyor 38 which is designed to deliver said sheared and incinerated portions to a storage location or to a baler or other device for further processing. As hereinabove mentioned, the mounting of the present apparatus on wheels permits it to be conveniently used by a scrap automobile dealer or the like right on his lot, thereby eliminating the difficult task of transporting the junked vehicles to the site of the processing equipment, and it also facilitates the positioning of said apparatus relative to the baler or shredder, or other processing equipment to be used in conjunction therewith.

From the foregoing detailed description it will be seen that the present invention provides a new and improved method and apparatus for reducing junked automobiles or other vehicles to re-usable scrap metal which has a number of advantages over the methods and devices heretofore used. With the present invention there is provided a continuous, uninterrupted operation whereby a vehicle is progressively sheared into relatively small, easily-handled portions, wherein said sheared portions are automatically continuously advanced through an incinerator interconnected to said shear unit to burn up the non-metallic materials therein, and wherein said sheared and incinerated vehicle portions are automatically continuously delivered to a baler or other desired processing equipment, or to a storage location. Said continuous processing method is more efficient and substantially less expensive than the methods heretofore employed.

It is to be understood that numerous modifications or variations in the method and apparatus hereinabove described are possible and the method may be used in connection with large items other than vehicles. It is intended to include herein not only the form of the invention described in the foregoing specification, and illustrated in the drawing, but also any and all variations, modifications or adaptations thereof as may come within the spirit of said invention and within the scope of the following claims.

What I claim is:

1. A method of converting junked metal items having combustible contaminants therein into reusable high grade scrap metal comprising shearing off portions of such items one after another by shearing across the lower portion of said item so that the shearing stroke causes said sheared portions to advance in the direction of the shearing stroke one after another, with each portion being pushed out from beneath the item and causing movement of the portion ahead, and incinerating said advancing portions to consume combustible contaminants therein.

2. The method recited in claim 1 wherein said shearing stroke shears and advances portions simultaneously.

3. The method recited in claim 1 and including the maintaining of said sheared portions in line formation and in contact one with another until after said sheared portions have been incinerated so that the shearing strokes cause advance through the entire procedure.

4. The method recited in claim 1 in which the shearing stroke causes the advance to be intermittent so that each portion is subject to the incinerating action for a sufficient length of time to provide for effective incineration of the contaminants.

5. The method recited in claim 1 in which the junked metal item is an automobile and is supported endwise in upright position, in which the shearing is performed by moving a ram-type shear transversely of the supported automobile to shear off similarly-sized portions one after another, and in which the endwise supported body is fed in a downward direction after each shearing stroke.

References Cited

UNITED STATES PATENTS

| | | | |
|---|---|---|---|
| 1,940,448 | 12/1933 | Corwin et al. | 75—63 X |
| 1,989,852 | 2/1935 | Eppensteiner | 75—63 |
| 2,943,930 | 7/1960 | Proler | 75—44 |
| 3,320,051 | 5/1967 | Lieberman | 75—43 |
| 3,323,908 | 6/1967 | Tezuka | 75—43 |
| 3,412,985 | 11/1968 | Perry et al. | 263—2 |

HENRY W. TARRING II, Primary Examiner

U.S. Cl. X.R.

75—43, 63; 83—160; 110—18; 263—2